United States Patent
Prieto Padilla et al.

(10) Patent No.: US 11,814,180 B2
(45) Date of Patent: Nov. 14, 2023

(54) AIR MANAGEMENT SYSTEM FOR AN AIRCRAFT

(71) Applicant: AIRBUS OPERATIONS, S.L.U., Madrid (ES)

(72) Inventors: Juan Tomas Prieto Padilla, Madrid (ES); Lucía Bayona Revilla, Madrid (ES); Diego Barron Vega, Madrid (ES)

(73) Assignee: AIRBUS OPERATIONS, S.L.U., Madrid (ES)

( * ) Notice: Subject to any disclaimer, the term of this patent is extended or adjusted under 35 U.S.C. 154(b) by 15 days.

(21) Appl. No.: 17/529,678

(22) Filed: Nov. 18, 2021

(65) Prior Publication Data

US 2022/0153420 A1 May 19, 2022

(30) Foreign Application Priority Data

Nov. 18, 2020 (EP) .................................... 20382999

(51) Int. Cl.
*B64D 13/02* (2006.01)
*B64D 13/06* (2006.01)
*B64D 27/10* (2006.01)

(52) U.S. Cl.
CPC ............ *B64D 13/06* (2013.01); *B64D 13/02* (2013.01); *B64D 27/10* (2013.01); *B64D 2013/0603* (2013.01); *B64D 2013/0618* (2013.01)

(58) Field of Classification Search
CPC ................. F02C 9/18; F02C 3/32; F02C 6/08
See application file for complete search history.

(56) References Cited

U.S. PATENT DOCUMENTS

| | | | |
|---|---|---|---|
| 4,263,786 A | 4/1981 | Eng | |
| 9,482,236 B2 * | 11/2016 | Khalid | ...................... F02C 9/18 |
| 10,648,366 B2 * | 5/2020 | Jouy | ....................... F01D 9/065 |
| 10,745,139 B2 * | 8/2020 | Retersdorf | ............. B64D 13/06 |
| 10,794,286 B2 * | 10/2020 | Adibhatla | ................. F02C 9/00 |
| 11,530,650 B2 * | 12/2022 | Galle | ......................... F02C 6/20 |
| 2010/0170574 A1 | 7/2010 | Fauque et al. | |
| 2012/0045317 A1 * | 2/2012 | Saladino | ................... F02C 6/08 415/145 |
| 2015/0251765 A1 * | 9/2015 | Jonqueres | .............. B64D 13/06 62/401 |
| 2018/0010520 A1 * | 1/2018 | Iwasaki | ................... F01D 5/187 |
| 2018/0312262 A1 | 11/2018 | Wiegers et al. | |
| 2019/0153963 A1 | 5/2019 | Kitaguchi | |
| 2020/0182162 A1 * | 6/2020 | Burge | ..................... F02C 7/141 |

OTHER PUBLICATIONS

Extended Search Report for EP20382999, dated May 7, 2021, 8 pages.

* cited by examiner

*Primary Examiner* — Thuyhang N Nguyen
(74) *Attorney, Agent, or Firm* — Nixon & Vanderhye P.C.

(57) ABSTRACT

An air management system with a set of compressed air sources for selectively supplying pressurized air to air consumer equipment according to an aircraft operation condition. Low pressure air, high pressure air, or a combination thereof may perform such supplying of compressed air depending on the aircraft operation condition.

16 Claims, 7 Drawing Sheets

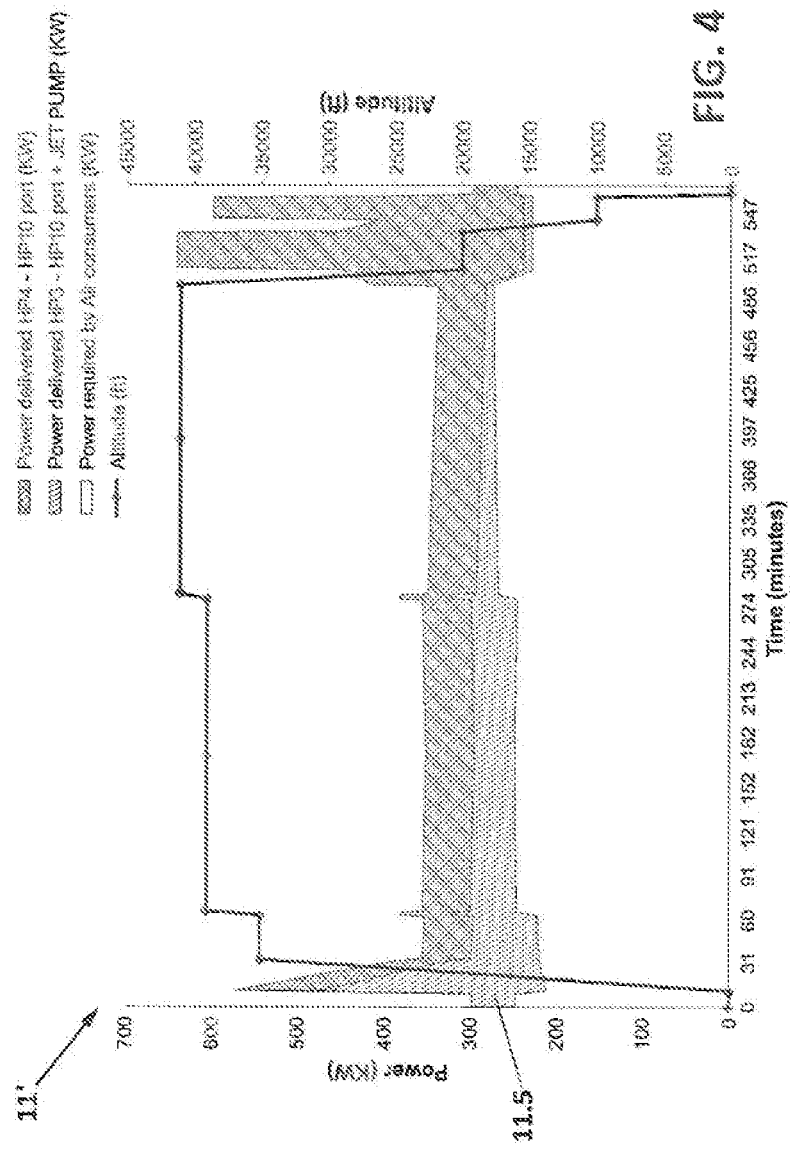

AIR MANAGEMENT SYSTEM FOR AN AIRCRAFT

RELATED APPLICATION

This application claims priority to and incorporates by reference European Patent Application EP20382999.9, which was filed on 18 Nov. 2020.

TECHNICAL FIELD

The present invention belongs to the field of pneumatic air distribution systems, and particularly, to the provision of different bleed air sources for supplying pressurized air to air consumer equipment in an aircraft.

BACKGROUND OF THE INVENTION

In gas turbine engines, bleed air is normally taken from compressor stages in the gas path of the engine upstream of fuel-burning chamber(s) in the engine. The bleed air is at high temperature and high pressure. Typical values for bleed air taken from a compressor of a gas turbine engine are in a range of 150 degrees Celsius (° C.) to 500° C., and at a pressure of 40 pounds per square inch (psig). The temperature is reduced using a pre-cooler to a range of 150° C. to 250° C.

The bleed air is channeled from one or more stages of the compressor of the gas turbine engine to various locations within an aircraft by an air management system. The air management system typically includes a network of bleed air ports, ducts, valves, and regulators. The air management system is adapted to withstand the high temperatures and pressures of the bleed air.

The bleed air is used to operate air consumer devices on an aircraft, such as an Air Cycle Machine(s) of an Environmental Control System (ECS), an Wing Anti-Ice system (WAIS) and other devices. These devices are referred to herein as "air consumers." The varying requirements of different air consumers within an aircraft require compressed air at different pressures and temperatures. For example, the air conditioning (ECS) is driven by the available pressure of the bleed air, and the WAIS is driven by the available temperature of the bleed air.

Typically, an air bleed system extracts bleed air from a compressor in a gas turbine engine r at two stages of the axial flow compressor. Bleed air ports at the various compressor stages duct bleed air from each of the stages. An intermediate pressure bleed air port (Intermediate port ("IP")) is located at a low-intermediate compressor stage on the gas turbine engine. A high pressure bleed air port (high port (HP)) is at an intermediate-high compressor stage (High Port. The bleed air ports are at different compressor stages to extract bleed air at two different conditions of pressure and temperature.

Typical values of bleed air extracted from each of the IP and HP ports are:
(A) Intermediate Port (IP) (also referred to as a low pressure port) provides bleed air in a range of pressure from 10 psig (at idling of the engine) to 180 psig (at maximum take-off thrust (MTO) of the engine), and temperatures in a range of 80° C. to 400° C., and
(B) High Port (HP) provides bleed air in a pressure range of 30 psig (at idling) to 650 psig (at MTO), and in a temperature range of 150° C. and 650° C. Although only two conventional ports have been discussed herein (IP and HP), the High Pressure Port (HP) may include more than one port (normally two ports) each located at a different intermediate to high compressor stages. Hereinafter, for illustrative purposes the possible ports (one or more) forming part of the High Pressure Port will be referred to collectively as (HP).

The exact values of pressure and temperature of the bleed air depends primarily on the engine speed, e.g., rotational speed of the compressor.

Under some circumstances, the channeling of bleed air may result in unexpected losses of bleed air, such as through leaks. These leaks could potentially lead to problems when operating an aircraft. Due to its inherent effect in the overall performance due to loss of bleed air pressure, detectors of leaks may be installed along the entire route of the channels for the bleed air. Eutectic salt-based sensors are widespread used in aircraft as overheat detection sensors that sense bleed air leakages throughout the channels.

The conditions of external air surrounding an aircraft, e.g., atmospheric air or ambient air, may drastically change as the aircraft moves from being on ground to being in flight, such as at an altitude of 30,000 feet. The air management system compensates for changes in external air by regulating the bleed air extracted from the IP and HP ports. To regulate the bleed air, the air management system relies on continuously bleeding air simultaneously from the IP and PH ports.

The IP and HP ports are sized to operate at any planned flight phase of an aircraft. The requirement that the ports be sized to allow the air management system to operate at all planned flight phases results in the ports being sized for a design condition at which the gas turbine and external air result in relatively low pressures and temperate of bleed air. Sizing the bleed air ports sized for a design condition in which the bleed air is at relatively low pressures and temperatures results in the ports being relatively large. The large ports extract excess bleed air out of the engine at flight conditions when the engine is producing relatively high pressure and high temperature bleed air. The bleeding of excess air from the engine reduces the thrust (loss of energy) produced by the engine. The loss energy produced by the engine for thrust is illustrated in the graph in FIG. 1.

Newer aircraft models use gas turbine engines such as Ultra-High By-Pass Ratio gas turbine engines. The bleed ports on these engines have HP port temperatures higher than with earlier engines and lower 'Fan port' pressures. The problems associated with loss of engine energy is exacerbated with the Ultra-High By-Pass Ration engines. Consequently, there is a need in the aerospace industry for an air management system that satisfies air consumers requirements with the optimum energy extracted from the gas turbine engines.

SUMMARY OF THE INVENTION

An air management system is disclosed in which bleed air is selectively taken from a first-intermediate compressor stage(s) of a gas turbine engine, from a last compressor stage(s), and from a combination of intermediate and last compressor stages. The amount of bleed air taken from each compressor stage depend on flight parameters of the aircraft, for instance the flight altitude. The air management system takes into account flight parameters to selectively feed air consumer equipment in the aircraft via one or more of the bleed ports at the above described compressor stages. By selectively bleeding air from different compressor stages, the air management system reduces energy losses in the gas turbine engine due to bleeding air.

The present invention may be embodied to reduce the energy loss in aircraft engines due to ports for bleed air.

In a first inventive embodiment, the invention provides an air management system for supplying pressurized air to an air consumer equipment of the aircraft, the air management system comprising: at least one air consumer;

(a) a gas turbine engine having a low pressure port located at a low-intermediate compressor stage of the gas turbine engine and a high pressure port located at a high-intermediate compressor stage of the gas turbine engine;

(b) a low pressure bleed duct configured to extract bleed air through an IP at a low to intermediate compressor stage of the gas turbine engine. The low pressure bleed duct comprises a first shut-off valve configured to selectively stop or allow the flow of low pressure air through the duct.

(c) a high pressure bleed duct configured for conveying air bled from the high pressure port, wherein the high pressure bleed duct comprises a second shut-off valve configured to stop or allow the flow of high pressure air downstream;

(d) a mixing chamber comprising an inlet port and an outlet port, wherein the inlet port is in fluid communication with the low pressure bleed duct and with the high pressure bleed duct forming a jet pump, and wherein the outlet port is in fluid communication with the at least one air consumer via an outlet duct, and (d) a control unit configured to receive an input relative to the aircraft operation condition and selectively operate at least the first shut-off valve and/or the second shut-off valve based on the received input.

As it was briefly discussed above, an air bleed system comprises a network of ducts and valves configured to convey compressed air from particular locations within the engine compressor (e.g. at particular compressor stages) for different uses. The temperature and pressure of the air is thus variable dependent upon the compressor stage at which compressed air is extracted ("bled").

The bleed system may comprises at least two ports, each configured to extract bleed air from a respective compressor stage of a gas turbine engine. A first port(the Intermediate Port, 'IP') is located at a low-intermediate compressor stage of the gas turbine engine. Another port (the High Pressure Port, 'HP') is located at an intermediate-high compressor stage of the gas turbine engine. Bleed air from the Intermediate Port is at a lower pressure and temperature than bleed air from the High Pressure Port.

The High Pressure Port (HP) may include more than one port, such as two. The High Pressure Port(s) are each at a different intermediate-high compressor stages of the compressor of a gas turbine engine that provides thrust to an aircraft. The HP are all at compressor stages at a higher pressure than the compressor stage at which is located the Intermediate Port. In a particular embodiment, the gas turbine engine may have a plurality of High Pressure Ports (HPs), wherein each may be located at different high-intermediate compressor stages of the gas turbine engine. The bleed air from the HPs may be jointly conveyed by the high pressure bleed duct to an inlet port of a mixing chamber.

Regardless the flight altitude or the flight phase of the aircraft, air bled from HP(s) comprises higher pressure and temperature than air bled from the IP. The terms 'low' and 'high' used in this specification distinguish the HP(s) from the IP. For the sake of clarity, terms 'low' and 'high' can be understood as equivalents to 'first' and 'second', respectively. Therefore, the expression 'a low pressure bleed duct configured for conveying air bled from the low pressure port' can be understood as 'a first-pressure bleed duct configured for conveying air bled from the first-pressure port'.

External air ("ambient air" or "atmospheric air") with a particular pressure, density and temperature surrounds the aircraft. The gas turbine engine ingests external air and passes the air through its compressors. External air can cause icing on the wings of the aircraft. Also, an interior, e.g., passenger cabin, may need to be pressurized and heated to provide air suited for passengers.. The pressure and temperature of the external air depends on whether the aircraft is on the ground or in flight. While in flight, the pressure and temperature of external air depends on the flight altitude and the flight phase. As the external air enters the compressor of a gas turbine engine, the pressure, temperature and other conditions of the external air may affect the compression of air as it moves through the compressor stages.

For a given gas turbine engine, air properties at each compressor stage may be predicted using compressor map, for instance, both at design and off-design conditions.

Aircraft operation condition is determined by the aircraft avionics using sensors and electronics on the aircraft. The aircraft avionics send data regarding the external air to a control unit for the air management system of the aircraft. The controller using the data indicating the pressure a temperature (and possibly other conditions such as humidity) of external air selects the compressed air source (IP, HP, or both) from which the bleed air is to be ducted to the mixing chamber.

Based on the aircraft operation condition ('input') received, the control unit determines the more suitable bleed air source(s) for supplying the consumers and actuates valves, e.g., shut-off valves that control the flow of bleed air through the HPs and IP.

By controlling the valves, e.g., the opening and closing of first and second shut-off valves, the inlet of the mixing chamber is supplied with bleed air at a desired pressure and/or temperature determined by the control unit. For example, controlling the valves may direct only high pressure air coming only from the HP into the mixing chamber, direct only low pressure air from only IP, or direct both high pressure and low pressure air from both the HP(s) and the IP. The mixing chamber is designed for minimizing pressure drops in any of the three situations.

The inlet port of the mixing chamber is in fluid communication, e.g., connected by ducts, with the low pressure bleed duct and with the high pressure bleed duct. The low pressure bleed duct receives bleed air from the IP, and the high pressure bleed duct receives bleed air from the HP(s). The mixing chamber is configured to receive low pressure air, high pressure air, or both low and high pressure air at the same time.

The injection of high pressure fluid in a low pressure fluid produces a Venturi effect that causes suction and ejects the possible mixture (when air from the two ports is received in the mixing chamber). The injection of a high pressure fluid in a low pressure fluid creates an air-mixing pump or jet pump to assist in moving the fluids through a duct or chamber.

Conventional air management systems rely on regulated mixed bleed air extracted from the two ports (IP and HP) at the same time to meet the particular requirements of the air consumers. In contrast, the present invention provides a solution that elects the more suitable source of bleed air, e.g., the IP and HP, depending on the ambient air (flight phase/altitude) and engine speed.

Flight phases that demand high energy, e.g., thrust, from the gas turbine engine(s) can include: ground operation (e.g. taxiing), take-off, or and the first portion of climbing after take-off, descent and approaching a landing on a runway. These high energy-demanding flight phases represents a small portion of the overall flight operation. During the high energy demanding flight phases, bleed air exclusively comes from the HP since the pressure delivered by the IP port is rendered not sufficient to meet the pressure requirements from the air consumers. Thus, contrary to conventional architecture where IP port (little) was used together with HP port (most), the present invention may be embodied to turn off a first shut-off valve to stop the flow of low pressure air from the IP during the high energy flight phases.

Because the bleed air was conventionally bled from IP in all flight phases, including those phases where the engine is at maximum power such as take-off, the aircraft gas turbine engine needed to be sized larger to produce the power (thrust) needed for takeoff while the bleed air is extracted from the IP. According to the present invention, because the IP port is closed during flight phases while maximum power is required from the engines, the engines can be sized a bit smaller because bleed air from the IP is not taken during high power operation of the engine. Thus, the present air management system advantageously affects the performance of the engines providing thrust and thereby improves the efficiency of the engines and reduces the fuel consumed by the engines during flight.

The air management system architecture may be sized according to cruise phase flight conditions. That is the low pressure bleed duct, the high pressure bleed duct, their respective shut-off valves, and the mixing chamber are sized according to cruise phase flight conditions.

In a particular embodiment, at the inlet port of the mixing chamber and/or the high pressure bleed duct each comprise a variable nozzle having a variable exit area that can be sized to regulate the high pressure air entering the mixing chamber. The control unit may be configured to adjust the size of the exit area of the variable nozzle based on a received input to the control unit, such as fight phase, external air conditions and power setting, e.g. percent of maximum power and/or engine speed, of the gas turbine engine.

US Patent Publication 2010/170574 A1, which is incorporated by reference, discloses a variable nozzle at the inlet of the mixing chamber. The novel air management system disclosed herein may comprise an air-mixing pump with variable injection section. The variable nozzle and the mixing chamber may form part of an air-mixing pump with variable injection section. A person of ordinary skill in the art of aircraft bleed systems and/or aircraft air management systems will understand that other forms of a variable nozzle at an outlet of a high pressure duct may be applied regulate of high pressure air entering the mixing chamber in the present invention.

Due to the variable nozzle, the amount or rate of air bled from the HP port can be finely regulated to meet the actual demands of the consumers and based on the flight phase and/or engine speed. For instance, at the 'holding' flight phase where the engine is idling, the IP port may not by itself be capable of providing bleed air at a sufficient pressure. Without the variable nozzle, the engine speed may need to be raised beyond idling to raise the pressure from the IP. Increasing the engine speed, increases the rate of fuel consumption by the engine. The variable nozzle allows for a controlled amount of high pressure bleed air from HP while an engine remains at idle. This controlled amount of high pressure bleed air is selected to meet the requirements for high pressure air in the air management system. Similarly, the controlled assistance by the HP is selected by the control unit based on actual needs of the air management system and reduces the amount of bleed air needed form the IP port. Thus, the variable nozzle, as adjusted by the control unit, bleeds from the HP port as much air as it is necessary for offsetting any energy peak demanded by the air consumers without substantial power loss.

Conventional HP ducting adapted for continuously supplying high pressure air can be replaced by the new high pressure bleed duct which only extends from HP port to the mixing chamber inlet to convey at certain flight phases (not all of them) said bleed air. The replacement of the conventional, larger and longer, HP ducting further entails the avoidance of the related fail-safe equipment such as sensors, valves (e.g. High Pressure Valve, 'HPV', or Over Pressure Valve, 'OVP'), etc. since the remaining outlet duct no longer conveys such a former high pressure and high-temperature air.

During a cruise flight phase, which may be the design point for the HP and IP, the consumers may be fed exclusively by low pressure air from the IP port. Also, the IP port may be slightly moved forwards or backwards on the engine, e.g., to a next compressor stage, to optimize the air management system operation for a majority of the flight (cruise). The location, e.g., compressor stage, of the IP on the compressor is optimized such that the bleed air extracted from the IP suffices to meet the air consumer requirements during long-term flight phases such as cruise.

In addition, the air management system disclosed herein advantageously affects to the overall aircraft performance in that there is a fuel burn benefit of around 1% of Thrust-specific fuel consumption (SFC) benefit in a typical short-range aircraft 800 nm (nautical miles) mission profile. This fuel saving is achieved thanks to a substantial weight reduction due to conventional HP ducting replacement, and OPV and HPV deletion and, as will be described hereinafter, around 50% pre-cooler size reduction.

Further, the invention may be embodiment without bleeding from the auxiliary power unit (APU) on the aircraft. For example, the APU bleed ducting with the associated OHDS may be unnecessary and not included on an aircraft in view of the invention.

In an alternative embodiment of the invention, at the inlet port of the mixing chamber, the high pressure bleed duct comprises a fixed nozzle for the high pressure air toward said mixing chamber. That is, in this embodiment, the mixing chamber comprises a fixed geometry i.e. fixed exit area, for allowing the passage of high pressure air toward the mixing chamber. Likewise, at the inlet port of the mixing chamber, the low pressure bleed duct also comprises a fixed geometry nozzle. Thus, the mixing chamber is optimized for mixing high pressure with low pressure air minimizing pressure drops.

For those situations where consumers are exclusively fed by high pressure air, the air management system may further comprises a branch duct in fluid communication with the high pressure bleed duct upstream the second shut-off valve and the outlet duct. This branch duct can be assimilated to the conventional HP ducting.

Therefore, said branch duct comprises a high pressure valve ('HPV') configured to maintain the high pressure air conveyed within predetermined, admissible, pressure and temperature levels.

In a particular embodiment, the at least one air consumer is at least one of the following: environmental control system; fuel tank inerting system; wing anti-ice system; engine starting system; water and waste; and/or hydraulic reservoirs pressurization.

In a particular embodiment, the environmental control system comprises a vapor cycle machine in fluid communication with the outlet duct. The vapor cycle machine pack(s) may require lower pressure to operate, which better fits with the pressure now delivered by the HP port through the variable nozzle.

Furthermore, along with the reduction of IP port by 1, 2 or 3 stages in comparison with conventional IP ports, lower pressure requirement of Vapor Cycle Machine packs during cruise conditions allows further improving 'SFC' benefit above 1% in a typical short-range aircraft. Similarly, other designs adequate to operate at lower pressure may be envisaged within the present invention.

In a particular embodiment, the air management system further comprises a pre-cooler in thermal communication with the outlet duct and a cooling air source. The pre-cooler is a heat exchanger typically arranged on the pylon attaching a engine to a wing or fuselage. The pre-cooler may be close to the gas turbine engine and provide thermal contact between a duct coming from HP/IP ports, and cooling air coming either coming from a fan port or directly ram air.

With the advent of Ultra-High By-Pass Ratio engines (that provide higher HP port temperatures and lower fan port pressure), pre-cooler integration in the pylon is challenging due to both the high temperature of the bleed air and the lower fan port pressure.

The present invention may allow a substantial, e.g., by 50%, of the pre-cooler as compared to a pre-cooler needed for a similar conventional air management system. The size of the pre-cooler size may be reduced because of lower temperatures in the output ducts for the bleed air. In a particular embodiment, the pre-cooler is dimensioned to operate with the air coming from the mixing chamber. In other words, to meet the air consumer requirements with the new air management system architecture, the pre-cooler is sized in holding flight phase, preferably when providing air to both the ECS and WAIS.

A holding phase is a well-known aircraft maneuver in which an in-flight aircraft delays its landing by holding at within a specified airspace at a particular altitude. The holding phase is an energy-demanding part of the flight, since altitude is not high enough and speed is relatively low. The holding phase, due it its high energy requirement, is often used as a design point for the Environmental Control System.

In a particular embodiment, the variable nozzle of the high pressure bleed duct is configured to control the exit area of the HP or inlet to the mixing chamber for adapting the supply of high pressure air according to the flight phase and/or altitude. Therefore, the amount of high pressure air delivered is adapted to the pressure required by the air consumer(s).

In a particular embodiment, the aircraft operation condition is a pre-determined flight altitude and/or the flight phase among the following: taxiing, take-off, climb, cruise, descent, holding, and landing.

The control unit may be configured to operate the first and second shut-off valves so that consumer(s) are fed exclusively with high pressure air below a pre-determined flight altitude (for instance, 15,000 ft.) and exclusively with low pressure air above such pre-determined flight altitude.

In an embodiment, the control unit is configured to selectively operate at least the first shut-off valve and/or the second shut-off valve according to the received input, so that:

(a) in taxiing, the first shut-off valve is closed while the second shut-off valve is opened allowing the flow of high pressure air toward at least one air consumer;

(b) in taking-off, the first shut-off valve is closed while the second shut-off valve is opened allowing the flow of high pressure toward at least one air consumer;

(c) in climbing, the first shut-off valve is closed while the second shut-off valve is opened up to a pre-determined flight altitude, being the pre-determined altitude, e.g., 15,000 ft; then, the first shut-off valve is switched to open while the second shut-off valve is switch to close allowing the flow of low pressure air toward at least one air consumer;

(d) in cruise, the first shut-off valve is opened while the second shut-off valve is closed allowing the flow of low pressure air toward at least one air consumer;

(e) in descending and landing, the first shut-off valve is closed while the second shut-off valve is opened allowing the flow of high pressure air toward at least one air consumer; and (f) in holding, either: the first shut-off valve and the second shut-off valve are opened allowing the flow of mixed air toward at least one air consumer, or the first shut-off valve is opened while the second shut-off valve is closed allowing the flow of low pressure air toward at least one air consumer.

The air management system takes benefit of:

(a) the efficiency of the gas turbine engine in its design point, i.e. during cruise (or above a certain flight altitude or flight level) to provide pressurized air from IP port with minimum energy loss, and (b) the immediate power of the high pressure air from HP port modulated by the variable nozzle during on-ground, early climbing and descent which permit to adapt the high pressure air delivered by the compressor to the pressure required by the consumers.

In cruise, the control unit may be configured to open both the first shut-off valve and the second shut-off valve allowing the flow of mixed air toward at least one air consumer.

That is, in a corner or failure situation, the control unit may open both shut-off valves in cruise in order the HP port assist the IP port for supplying the consumers.

Nevertheless, for safety reasons, the aircraft could not potentially dispatch with a variable nozzle failed in a configuration when a bleed system is off, that is, that the bleeding system of an engine has failed.

In a second inventive aspect, the invention may be embodied as a method for supplying pressurized air to air consumer, the method comprising:

(a) providing an air management system according to any of the embodiments of the first inventive aspect;

(b) receiving by the control unit an input relative to the aircraft operation condition; and © operating the at least the first shut-off valve and/or the second shut-off valve based on the received input.

In a particular embodiment, the method further comprising:

operating by the control unit the at least the first shut-off valve and/or the second shut-off valve depending on the received input, so that:

(a) in taxiing, the at least one air consumer is supplied with high pressure air;

(b) in taking-off, the at least one air consumer is supplied with high pressure air;

(c) in climbing, the at least one air consumer is supplied with high pressure air up to the pre-determined altitude, being the pre-determined altitude, such as 15,000 ft; then, the at least one air consumer is supplied with low pressure air;

(d) in cruise, the at least one air consumer is supplied with low pressure air;

(e) in descending, and landing, the at least one air consumer is supplied with high pressure air;

(f) in holding, either: the at least one air consumer is supplied with mixed air, or the at least one air consumer is supplied with low pressure air.

In a third inventive aspect, the invention may be embodied as an aircraft comprising an air management system according to any of the embodiments of the first inventive aspect.

In a fourth inventive aspect, the invention provides a data processing apparatus comprising means for carrying out the method according to any of the embodiments of the second inventive aspect.

In a fifth inventive aspect, the invention provides a computer program comprising instructions which, when the program is executed by a computer, cause the computer to carry out the method according to any of the embodiments of the second inventive aspect.

All the features described in this specification (including the claims, description and drawings) and/or all the steps of the described method can be combined in any combination, with the exception of combinations of such mutually exclusive features and/or steps.

SUMMARY OF THE DRAWINGS

These and other characteristics and advantages of the invention will become clearly understood in view of the detailed description of the invention which becomes apparent from a disclosed embodiment of the invention, given just as an example and not being limited thereto, with reference to the drawings.

FIG. 4 is a schematic graph of the power delivering of the air management system shown in FIG. 3c in comparison with power required by air consumers.

FIGS. 5A and 5B show schematic representations of an aircraft mission profile using an air management system according to the present invention throughout the flight phases, wherein FIG. 5A shows a nominal case and FIG. 5B shows a failure scenario.

DETAILED DESCRIPTION

As it will be appreciated by one skilled in the art, aspects of the present invention may be embodied as an air management system (1), a method, a data processing apparatus, a computer program, or as an aircraft (10).

Figure 1:
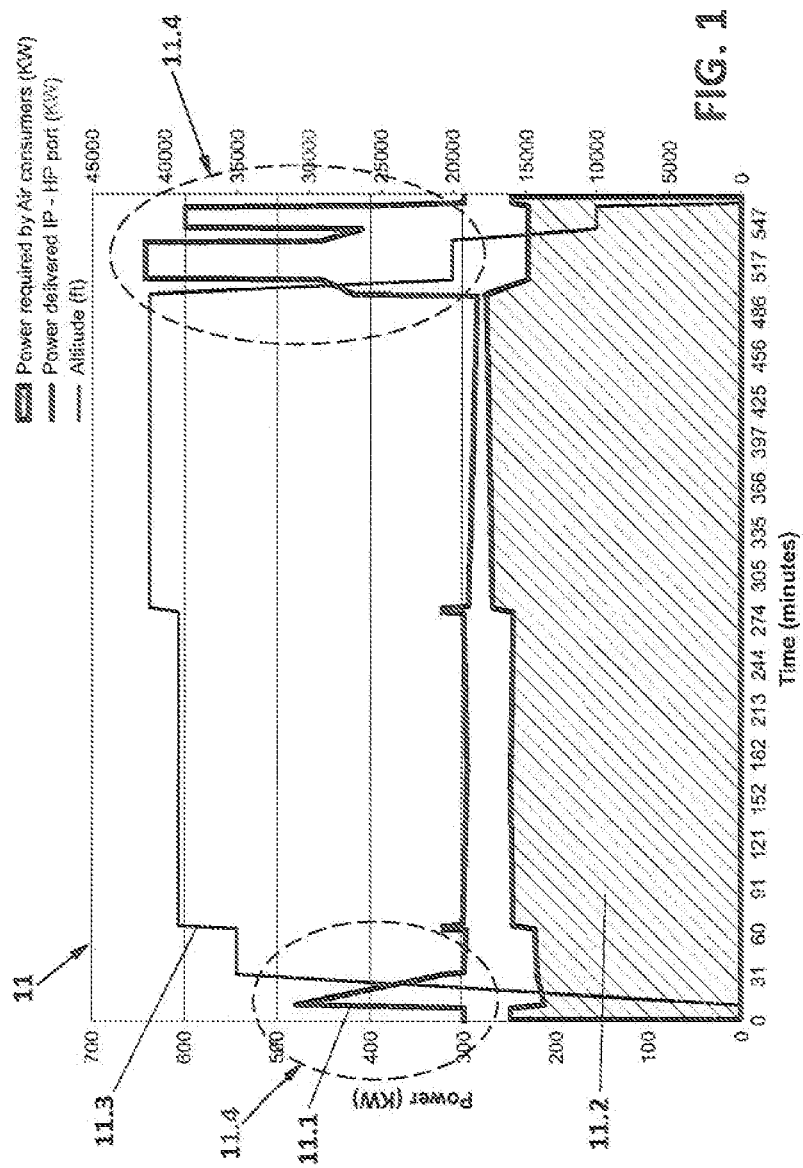
FIG. 1 is a graph of a conventional IP, HP air power delivering in comparison with power required by air consumers.

FIG. 1 depicts a schematic graph (11) of an ability of a conventional IP—HP air bleed system (20) to deliver power (11.1) in comparison with the power required (11.2) by air consumers (2) in an aircraft throughout a complete flight. FIG. 1 shows the power in kiloWatts (kW) required (11.2) by air consumers as compared to the power (kW) delivered (11.1) by a conventional IP—HP air bleed system, such as the one shown in FIG. 3a. FIG. 1 also identifies the flight phases (11.3) through which aircraft (10) passes in a complete flight, in particular taking altitude as a reference to place the aircraft in each of such flight phases. The left-ordinate axis of the graph in FIG. 1 indicates power (in kW), while right-ordinate axis indicates flight altitude (in ft.). Finally, the abscissa axis of FIG. 1 refers to flight time (in minutes).

In this exemplary mission profile shown in FIG. 1, there is a mismatch between power supplied by the air bleed system (20) and the power required by the air consumers (2) both at the beginning and at the end of the flight. At the beginning and end of a flight, the aircraft (10) is on the-ground or below a certain flight altitude.

A typical IP—HP air bleed system (20) is conventionally designed to extract bleed air by default from the IP port during most of the flight, including during take-off, climbing, cruise, and holding. The HP port provides bleed air primarily if the bleed air from the IP port is providing enough air pressure to meet air consumer requirements.

In phases where HP port is extracting bleed air to supply air consumers (2), there is a significant energy loss as it can be seen by peaks (11.4) in the graph (11) (selected by dashed circles). Those peaks (11.4) represent a power mismatch which entails an energy loss.

This energy loss is because:

(a) on one hand, the energy delivered by the HP port during holding is significantly higher than the energy required by air consumers. HP port is mainly used under these conditions because the energy delivered by the IP port is lower than the energy required; and (b) the energy delivered by the IP port during take-off and early climb phases is significantly higher than the energy required, since the IP port is selected to meet the requirements of the air consumers during cruise. Further, in cruise, the energy extracted from the IP port is lower than during take-off and climbing phases.

Figure 2:
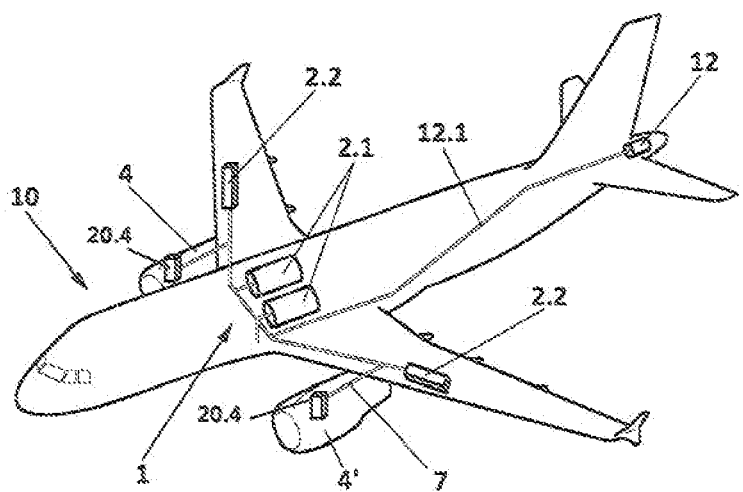
FIG. 2 is a schematic representation of an aircraft comprising an air management system according to the present invention.

FIG. 2 depicts a schematic representation of an aircraft (10) comprising an air management system (1).

In particular, the aircraft (10) comprises two gas turbine engines (4, 4') attached to the underside from the wings by respective pylons. The gas turbine engines provide thrust to propel the aircraft in flight. For illustrative reasons, it is schematically represented as a single line both the low pressure bleed duct (4.1) and the high pressure bleed duct (5) coming from the low pressure port (4.1) (IP port) located at a low-intermediate compressor stage of the gas turbine engine (3) and the high pressure port (5.1) (HP port) located at a high-intermediate compressor stage, respectively. It is to be noted that the mixing chamber (6), and first (4.2) and second (5.2) shut-off valves, as well as other hydraulic equipment are not shown in this figure.

The bleed ports (IP and HP) are in fluid communication (by the outlet duct (7)) with the wing anti-ice system (WAIS—2.2) and the Air Conditioning Packs (2.1) of the ECS to convey pressurized air thereto. In addition, the Air Conditioning Packs may be replaced by Vapor Cycle Machine Packs which need lower air pressure in comparison with conventional Air Conditioning Packs. Although only WAIS (2.2) and ECS (2.1) are representative of all air consumers, other minor air consumers may be used such as: fuel tank inerting system, engine starting system, water and waste, and/or hydraulic reservoirs pressurization.

The aircraft (10) may also comprise an Auxiliary Power Unit ('APU') (12) at the tailcone thereof. This APU (12) may be also in fluid communication (by APU bleed ducting (12.1)) with the WAIS (2.2) and Air Conditioning Packs (2.1) of the ECS to provide either pneumatic or electrical energy thereto. A typical APU bleed ducting (12.1) for pneumatic mode is associated with OverHeat Detection System ('OHDS') for safety reasons.

A control unit (not shown throughout these figures) is electrically connected to at least the first shut-off valve (4.2) and the second shut-off valve (5.2) to selectively operate them based on an aircraft (10) predetermined operational condition. In addition, the control unit may be electrically connected further valves of the air management system (1), such as the variable nozzle, to allow the bleed air coming from any of the ports (4.1, 5.1) either to pass through, or being cut-off, or the flow rate being modulated. The aircraft (10) predetermined operation condition may be a pre-determined flight altitude, for instance 15,000 ft., and/or any of the flight phases seen in FIGS. 5a and 5b.

Figure 3A:
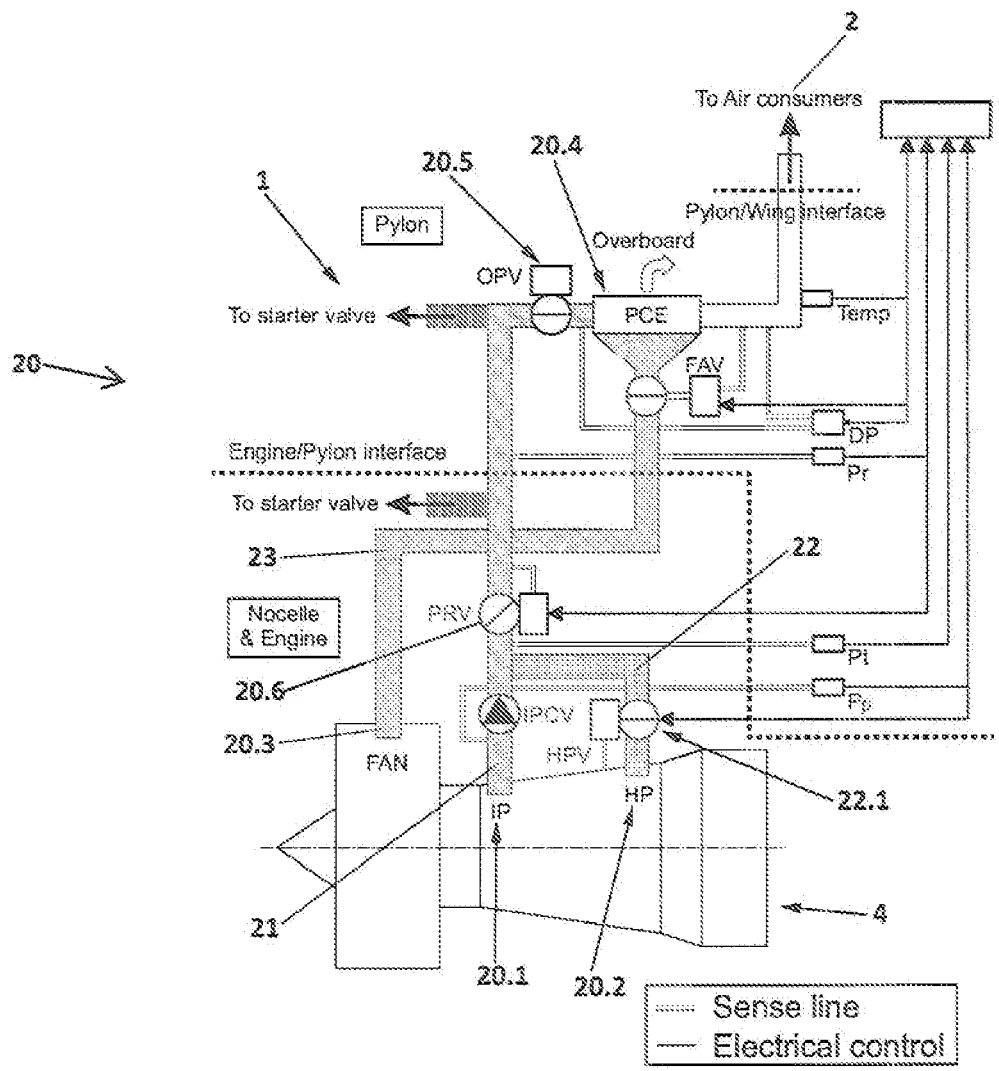
FIG. 3A is a schematic diagram of an architecture of a conventional air management system.

FIG. 3a depicts a schematic architecture of a conventional air management system (1). Two ports, IP (20.1) and HP (20.2), coming from the compressor stage of the gas turbine engine (4). Additionally, there is a third port (20.3) in fluid communication with the fan by a fan duct (23), specifically design to extract cooling air therefrom and direct it to a pre-cooler (20.4).

The pre-cooler (20.4) may be designed to operate with the bleed air extracted from the two ports (IP and HP) at respective compressor stages of the gas turbine to which the ports are attached. The bleed air extracted from HP (20.2) has higher pressure and temperature than the bleed air extracted from the IP, the pre-cooler (20.4) has bigger size to increase the cooling effect. Pre-coolers are normally integrated within the pylon. Alternatively, cooling air may directly come from ram air instead from a third port (20.3) bleeding air from the fan of the gas turbine engine.

Valves, regulators, and other hydraulic components are also included in a conventional air management system (1) of an aircraft (10). These include, an overpressure valve ('OPV') (20.5), also named as a relief valve, and a High Pressure Valve ('HPV') (22.1) that maintains the pressurized air conveyed through HP ducting (22) at an admissible pressure and temperature.

Also, air extracted from the IP port (20.1) may be regulated via a Pressure Regulating Valve ('PRV') (20.6). Further, a valve referenced as 'IPCV' is interposed between IP port and the joining point where formerly IP ducting (21) and HP ducting (22) were abruptly brought together for preventing from reverse flow.

Figure 3B:
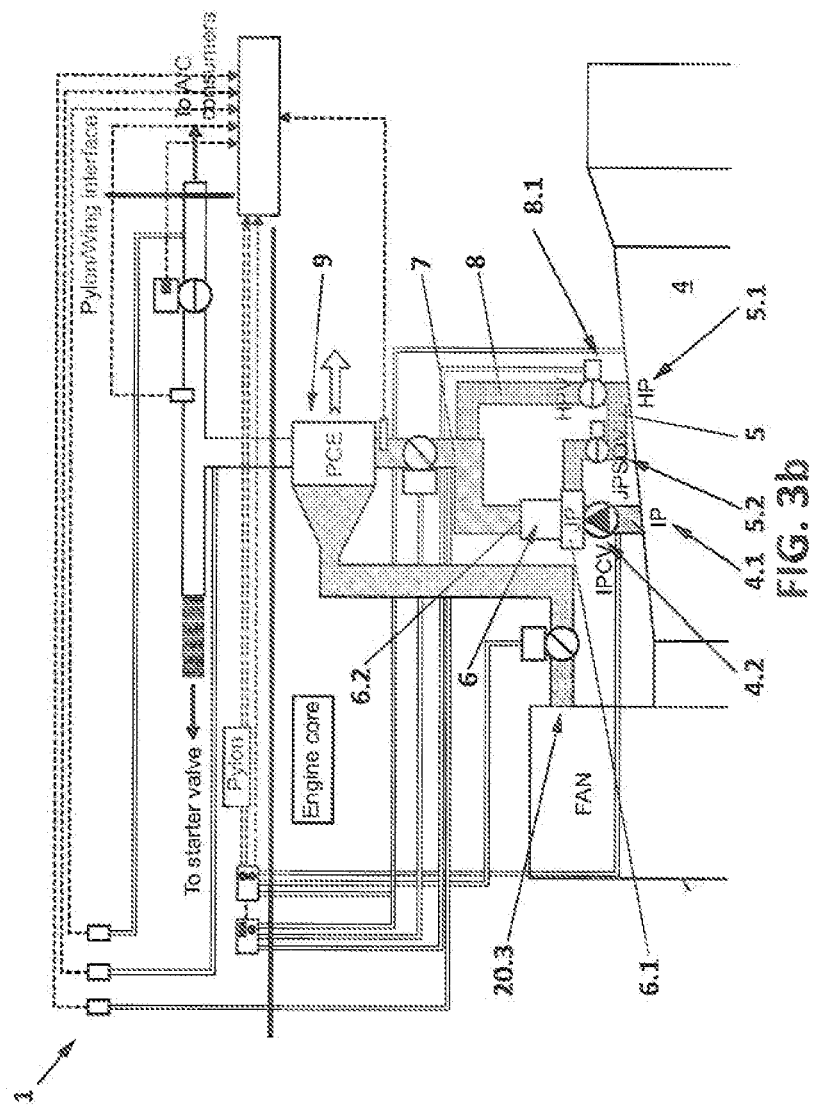
FIG. 3B is a schematic diagram of an air management system architecture of an embodiment of the air management system according to the present invention with a fixed nozzle.

FIG. 3B depicts a schematic architecture of an air management system (1) according to an embodiment of the present invention. As an example, it may form the pneumatic scheme of the air management system (1) shown in FIG. 2.

In comparison with the conventional hydraulic scheme of FIG. 3a, the pneumatic scheme of an air management system (1) shown in FIG. 3B is similar in lay-out, but includes additional elements including:

(a) a low pressure bleed duct (4) configured for conveying air bled from the low pressure port (4.1), wherein the low pressure bleed duct (4) comprises a first shut-off valve (4.2) configured to stop or allow the flow of low pressure air downstream;

(b) a high pressure bleed duct (5) configured for conveying air bled from the high pressure port (5.1), wherein the high pressure bleed duct (5) comprises a second shut-off valve (5.2) configured to stop or allow the flow of high pressure air downstream; and (c) a mixing chamber (6) comprising an inlet port (6.1) and an outlet port (6.2), wherein the inlet port (6.1) is in fluid communication with both the low pressure bleed duct (4) and the high pressure bleed duct (5) forming a jet pump within the mixing chamber, and wherein the outlet port (6.2) is in fluid communication with the at least one air consumer (2) via an outlet duct (7), In particular, at the inlet port (6.1) of the mixing chamber (6), the high pressure bleed duct (5) comprises a fixed nozzle (not shown) for the high pressure air toward said mixing chamber (6).

As it is fixed, the exit area is determined irrespective of the flight phase or altitude and, then, the formed jet pump only functions ideally at a single operating condition.

Therefore, for supplying high pressure air exclusively, the air management system (1) further comprises a branch duct (8) in fluid communication with the high pressure bleed duct (5)—upstream the second shut-off valve (5.2)—and the outlet duct (7), in order to divert such air in high-energy demanding situations.

This branch duct (8) is quite similar to the conventional HP ducting (22) (see FIG. 3a) and, therefore, comprises fail-safe equipment such as a high pressure valve (8.1) configured to maintain the high pressure air conveyed within predetermined pressure and temperature levels.

Figure 3C:
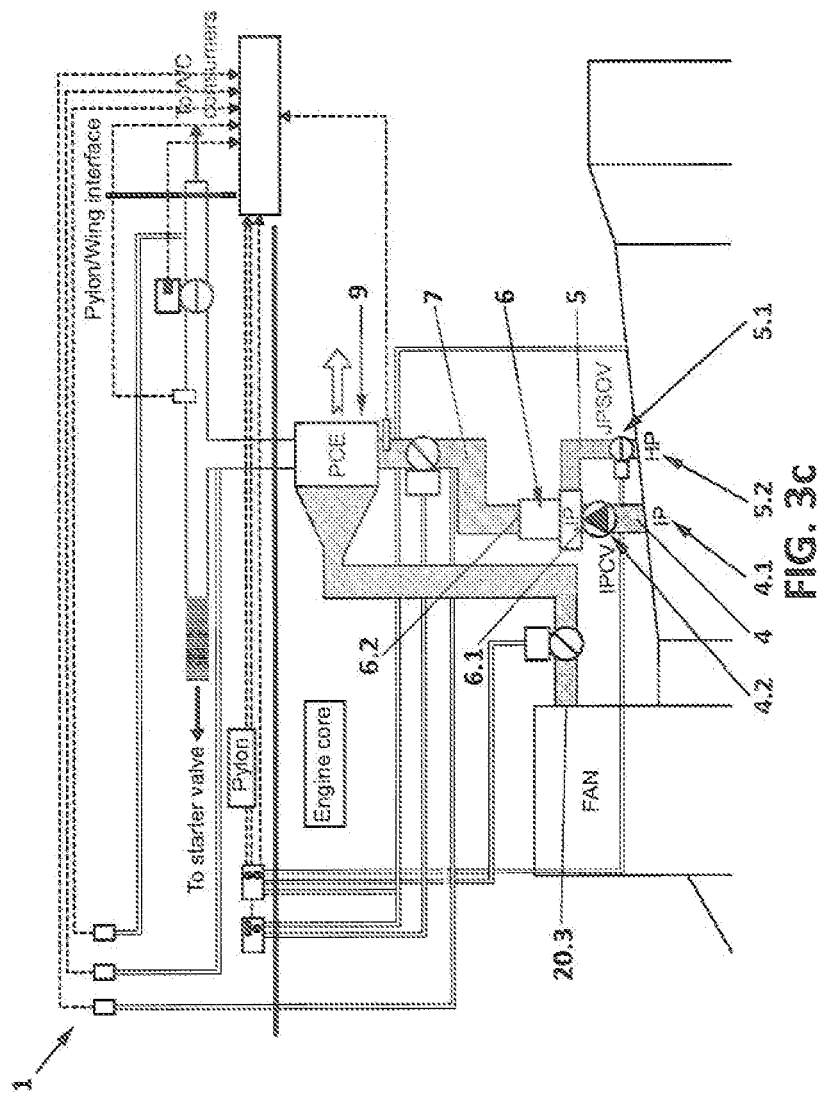
FIG. 3C is a schematic diagram of an air management system architecture of an embodiment of the invention with a variable nozzle.

FIG. 3c depicts a yet another embodiment of the air management system (1) according to the present invention wherein, at the inlet port (6.1) of the mixing chamber (6), the high pressure bleed duct (5) comprises a variable nozzle (not shown) whose position determines the exit area for the high pressure air toward said mixing chamber (6), and wherein the control unit is further configured to control the exit area of the variable nozzle based on the received input.

Therefore, the amount of high pressure air injected through the variable nozzle can be regulated as needed thus optimizing the jet pump function, i.e. the Venturi effect, for the particular operating condition.

Compared with FIG. 3b, it can be seen that thanks to the variability of the nozzle allowing to let as much high pressure air to pass as conventionally, there is no need for the branch duct (8). Thus, in this embodiment, either if the consumers (2) are supplied exclusively with low pressure air, exclusively with high pressure air, or both at the same time, said air will always pass through the mixing chamber.

Further, former Over-Pressure Valve (20.5) is no longer needed as maximum air pressure remains at admissible levels, for instance below 90 psig.

Additionally, as it can be seen in FIG. 3c there is a third port (20.3) in fluid communication with the fan, specifically designed to extract cooling air therefrom and direct it to a pre-cooler (9).

Since air reaching the pre-cooler (9) from the hot side (that is, from the outlet duct (7)) is not as hot as conventionally, the pre-cooler is specifically designed and sized to operate with the air coming from the mixing chamber ( ). In addition, IP port pressure can be boosted up to avoid switching to HP port giving rise to a pre-cooler size reduction of about 50%.

Once the compressed air coming from the mixing chamber (6) has been cooled down in the pre-cooler (9), it is directed to the air consumers (2) as the arrow points out.

It is to be noted that the present air management system (1) may regulate conveyed air at less temperature than nowadays temperature regulation which is about 200° C.

Further, IP port (4.1) location may be advantageously reduced by 1-3 stages because, inter alia, the low pressure requirement of Vapor Cycle Machine Packs above 15000 ft., although not shown herein for illustrative purposes.

FIG. 4 depicts a schematic graph (11') of the power delivering of the air management system of FIG. 3c in comparison with power required by air consumers (2).

To better compare the benefits in terms of power saving of the air management system according to FIG. 3c, the schematic graph (11) of former FIG. 1 is reproduced again. Superimposed to this, it is depicted the power delivered in kW by the air management system (1) according to the invention.

As it can be observed, this power delivered (11.5) better suits the power required (11.2) by the air consumers in kW. More particularly, there is an enormous benefit in the holding flight phase because, in this phase, the energy delivered by the IP port is assisted and fine-tuned by the HP port in the mixing chamber with the variable nozzle avoiding any waste of energy and impacting in fuel saving.

The present invention further provides a method for supplying pressurized air to the air consumer (2) equipment. Briefly, the steps of said method are as follows:

(a) providing an air management system (1) as described hereinabove;

(b) receiving by the control unit (not shown) an input relative to the aircraft (10) operation condition; and (c) operating the at least the first shut-off valve (4.2) and/or the second shut-off valve (5.2) based on the received input.

Figure 5A:
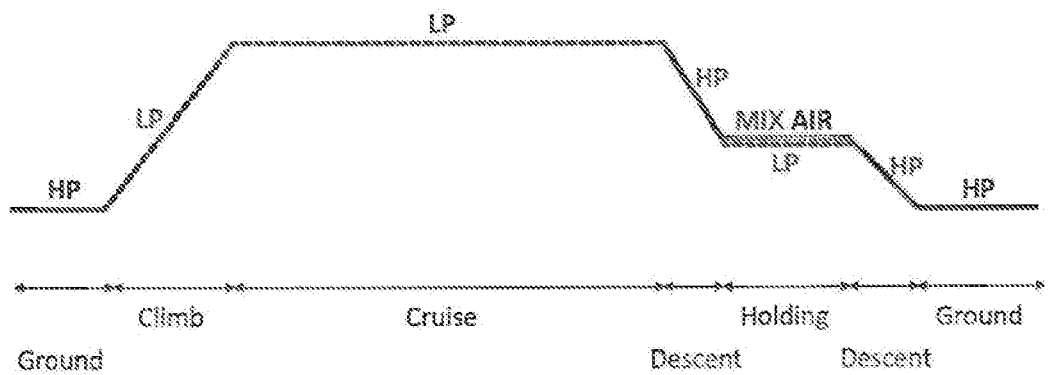

FIG. 5a depicts an exemplary aircraft (10) mission profile using an air management system (1) according to the present invention throughout the flight phases in nominal case.

If the at least one air consumer (2) is supplied with low pressure air, it is represented in dotted line. Else if, when the at least one air consumer (2) is supplied with high pressure air, it is represented in continuous line. Finally, if the at least one air consumer (2) is supplied with mixed air, it is represented in dashed line.

In particular, the criteria follow by the control unit to operate the first shut-off valve and/or the second shut-off valve upon receiving an aircraft (10) operation condition (i.e. flight altitude or flight phase) is summarized as follows:
(a) below a pre-determined altitude, such as 15,000 ft.,
  (a.1) in taxiing, the at least one air consumer (2) is supplied with high pressure air;
  (a.2) in taking-off, the at least one air consumer (2) is supplied with high pressure air; and
  (a.3) in climbing, the at least one air consumer (2) is supplied with high pressure air up to the pre-determined altitude;
(b) Above the pre-determined altitude:
  (b.1) still in climbing, the at least one air consumer (2) is supplied with low pressure air;
  (b.2) in cruise, the at least one air consumer (2) is supplied with low pressure air; and
  (b.3) Once cruise phase ends: in descending and landing, the at least one air consumer (2) is supplied with high pressure air; and in holding, either: the at least one air consumer (2) is supplied with mixed air, or the at least one air consumer (2) is supplied with low pressure air.

Depending on, inter alia, the required consumer air pressure during holding the control unit may operate the first (4.2) and/or second (5.2) shut-off valves to supply exclusively low pressure air or, in addition, high pressure air to meet peak demands.

In other words, as the aircraft (10) passes from one phase to another, the control unit receives the corresponding input and operates the corresponding shut-off valves and, optionally, the variable nozzle.

As it was already mentioned, since air management system (1) operates in favorable conditions from energy cost point of view (high altitude and relative high speed), the air management system (1) architecture is sized according to cruise phase flight conditions, which encompasses a majority of the flight.

Energy-demanding flight phases such as on-ground operation, take-off, or even the first portion of climbing, as well as other phases like descent (or approaching) relies exclusively in pressurized air supplied by the HP port.

Therefore, the variable nozzle adapts the delivered HP pressure air to the required pressure by the air consumer (2) upon indication from the control unit.

Figure 5B:
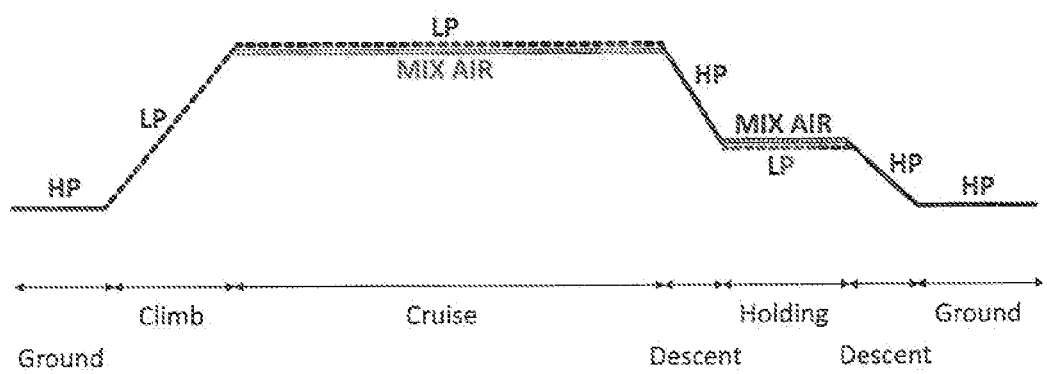

Further, FIG. 5b depicts exemplary aircraft (10) mission profile using an air management system (1) according to the present invention throughout the flight phases in a failure scenario.

In comparison with FIG. 5a, in cruise, the control unit is further configured to open both the first shut-off valve (4.2) and the second shut-off valve (5.2) allowing the flow of mixed air toward at least one air consumer.

In other words, in a corner or failure situation, the control unit may open both shut-off valves in cruise in order the HP port assist the IP port for supplying the consumers depending, inter alia, on the air consumers pressure required during this phase.

Throughout the entire description, the person skilled in the art would recognize that specific figures of aircraft (10) operation, or parameters of air bleed systems highly depend on specifics of the aircraft (10) model.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An air management system for supplying pressurized air to an aircraft, the air management system comprising:
   at least one air consumer device;
   a gas turbine engine including a low pressure port located at a low to intermediate compressor stage of the gas turbine engine and a high pressure port located at a high to intermediate compressor stage of the gas turbine engine;
   a low pressure bleed duct configured to convey low pressure air received from the low pressure port, wherein the low pressure bleed duct includes a first shut-off valve configured to be controlled to selectively stop and allow the low pressure air to flow through the low pressure bleed duct;

a high pressure bleed duct configured to convey high pressure air received from the high pressure port, wherein the high pressure bleed duct includes a second shut-off valve configured to be controlled to selectively stop and allow the high pressure air to flow through the high pressure bleed duct;

a mixing chamber including an inlet port and an outlet port, wherein the inlet port is in fluid communication with the low pressure bleed duct and with the high pressure bleed duct, wherein the high pressure air entering the mixing chamber forms a jet pump pumping the low pressure bleed air into the mixing chamber, and wherein the outlet port is in fluid communication with the at least one air consumer via an outlet duct, and a control unit configured to receive an input representative of a current operational condition of the aircraft, and selectively operate at least one of the first shut-off valve and the second shut-off valve based on the received input, wherein the control unit is configured to selectively operate at least one of the first shut-off valve and the second shut-off valve according to the received input as follows:

during taxiing of the aircraft, the first shut-off valve is closed while the second shut-off valve is open allowing the flow of high pressure air toward at least one air consumer;

during take-off of the aircraft, the first shut-off valve is closed while the second shut-off valve is open allowing the flow of high pressure toward at least one air consumer;

during climbing of the aircraft, the first shut-off valve is closed while the second shut-off valve is open while the aircraft climbs to a pre-determined altitude, and, in response to the aircraft climbing about the pre-determined altitude, the first shut-off valve is open and the second shut-off valve is closed;

during a cruise flight condition of the aircraft, the first shut-off valve is open and the second shut-off valve is closed;

during decent and landing of the aircraft, the first shut-off valve is closed and the second shut-off valve is open; and during a flight holding pattern by the aircraft in preparation for a landing, the first shut-off valve and the second shut-off valve are configured as either: (i) the first shut-off valve and the second shut-off valve are open, or (ii) the first shut-off valve is open and the second shut-off valve is closed.

2. The air management system according to claim 1, further comprising a variable nozzle in the high pressure bleed duct and proximate the inlet port of the mixing chamber, wherein the variable nozzle includes a variable area flow passage for the high pressure air and wherein the variable area flow passage is adjusted by the control unit based on the received input.

3. The air management system according to claim 2, wherein the variable nozzle of the high pressure bleed duct is configured to control an exit area for adapting the supply of high pressure air according to the flight phase and/or altitude.

4. The air management system according to claim 1, further comprising a fixed nozzle proximate the inlet port of the mixing chamber and configured to inject the high pressure bleed air from the high pressure bleed duct towards the mixing chamber, wherein the air management system further comprises a branch duct in fluid communication with the high pressure bleed duct at a location on the high pressure bleed duct upstream the second shut-off valve, and wherein the branch duct comprises a high pressure valve configured to maintain the high pressure air flowing through the high pressure bleed duct within a predetermined pressure range and/or a predetermined temperature range.

5. The air management system according to claim 1, wherein the at least one air consumer is at least one of:
an environmental control system;
a fuel tank inerting system;
a wing anti-ice system;
an engine starting system;
a water and waste system; and
a hydraulic reservoir pressurization system.

6. The air management system according to claim 5, wherein the environmental control system comprises a vapor cycle machine in fluid communication with the outlet duct.

7. The air management system according to claim 1, further comprising a pre-cooler in thermal communication with the outlet duct and a cooling air source.

8. The air management system according to claim 7, wherein the pre-cooler is dimensioned to operate with the air flowing from the mixing chamber though the outlet duct.

9. The air management system according to claim 1, wherein at least one of: the low pressure bleed duct, the first shut-off valve, the high pressure bleed duct, the second shut-off valves, and the mixing chamber is sized based on a cruise phase flight condition.

10. The air management system according to claim 1, wherein during a cruise flight condition of the aircraft, the control unit is configured to open both the first shut-off valve and the second shut-off valve.

11. An aircraft comprising:
an air consumer device;
a gas turbine engine configured to provide thrust to fly the aircraft, and the gas turbine engine including a low pressure port in fluid communication with a low to intermediate compressor stage of the gas turbine engine, and a high pressure port in fluid communication with a high to intermediate compressor stage of the gas turbine engine;
a low pressure bleed duct configured to convey low pressure air received from the low pressure port;
a first shut-off valve configured to be controlled to selectively stop and allow the low pressure air to flow through the low pressure bleed duct;
a high pressure bleed duct configured to convey high pressure air received from the high pressure port;
a second shut-off valve configured to be controlled to selectively stop and allow the high pressure air to flow through the high pressure bleed duct;
a mixing chamber including:
an inlet port in fluid communication with both the low pressure bleed duct and with the high pressure bleed duct, and
an outlet port in fluid communication with the air consumer, and
a control unit configured to receive an input representative of a current operational condition of the aircraft, wherein the control unit is configured to selectively operate at least one of the first shut-off valve and the second shut-off valve according to the received input as follows:
- during taxiing, take-off, climbing, decent and landing operational conditions of the aircraft, the first shut-off valve is closed and the second shut-off valve is open, and
- during a cruise flight operational condition, the first shut-off valve is open and the second shut-off valve is closed.

12. The aircraft of claim 11, further comprising a nozzle in the high pressure bleed duct and configured to jet the high pressure bleed air into the inlet port of the mixing chamber, wherein jetting the high pressure bleed air pumps the low pressure bleed air into the mixing chamber.

13. A method for supplying pressurized air to an air consumer in an aircraft, the method comprising:
- directing low pressure bleed air into a low pressure bleed duct from an low to intermediate compressor stage of a gas turbine engine producing propulsion for flight of the aircraft, wherein a first shut-off valve regulates the low pressure bleed air flowing through the low pressure bleed duct;
- directing high pressure bleed air into a high pressure bleed duct from an intermediate to high compressor stage of the gas turbine, wherein a second shut-off valve regulates the high pressure bleed air flowing through the high pressure bleed duct;
- directing the high pressure bleed air from the high pressure bleed duct into a mixing chamber;
- directing the low pressure bleed air from the low pressure bleed duct into the mixing chamber;
- directing the low pressure bleed air and/or the high pressure bleed air from the mixing chamber to an air consumer in the aircraft;
- during taxiing, take-off, climbing, decent and landing operations of the aircraft, the first shut-off valve is closed and the second shut-off valve is open, and
- during a cruise flight operation, the first shut-off valve is open and the second shut-off valve is closed.

14. The method of claim 13, wherein a nozzle in the high pressure bleed duct is oriented toward an outlet of the low pressure bleed duct, and the method further comprise jetting the high pressure bleed air form the nozzle to jet pump the low pressure bleed air into the mixing chamber.

15. The method of claim 14, wherein the nozzle is a variable nozzle, and the method further comprises regulating a flow of the high pressure bleed air by adjusting the variable nozzle, wherein the adjustment of the variable nozzle is dependent on a flight parameter of the aircraft including at least one of: a fight phase of the aircraft, a condition of external air surrounding the aircraft, a power setting of the gas turbine engine, and an engine speed of the gas turbine engine.

16. The method of claim 13, wherein the second shut-off valve regulates the flow of the high pressure bleed air, and the method further comprises at least one of:
- in response to a cruise flight condition of the aircraft, automatically opening the first shut-off valve and closing the second shut-off valve to allow only the low pressure bleed air to enter the mixing chamber;
- in response to the decent of the aircraft towards landing or the landing of the aircraft, automatically closing the first shut-off valve and opening the second shut-off valve to allow only the high pressure bleed air to enter the mixing chamber;
- in response to the aircraft flying a holding pattern prior to the landing, opening both the first shut-off valve and the second shut-off valve to allow both the high pressure bleed air and the low pressure bleed air to enter the mixing chamber.

* * * * *